United States Patent [19]

Tsujikawa et al.

[11] 3,960,507

[45] June 1, 1976

[54] APPARATUS FOR REMOVING NITROGEN OXIDES FROM A CONTAMINATED GAS CONTAINING THE SAME

[75] Inventors: Masahiro Tsujikawa, Izumiotsu; Minoru Ozasa; Fumio Takagi, both of Kyoto; Katsumi Hirai, Hirakata; Akio Iwasaki, Osaka; Hiroshi Imamura; Testuhiro Ueda, both of Toyonaka, all of Japan

[73] Assignee: Matsushita Electric Industrial Co., Ltd., Japan

[22] Filed: July 12, 1974

[21] Appl. No.: 488,118

Related U.S. Application Data

[62] Division of Ser. No. 313,372, Dec. 8, 1972, abandoned.

[30] Foreign Application Priority Data

Dec. 9, 1971 Japan .................................... 9942
Aug. 22, 1972 Japan .............................. 47-84292

[52] U.S. Cl. ............................. 23/288 K; 23/284; 23/288 R; 55/233; 55/DIG. 30; 261/DIG. 9
[51] Int. Cl.² ........................................... B01J 8/02
[58] Field of Search ............. 23/288 R, 288 K, 284; 55/68, 90, 233, DIG. 30; 261/DIG. 9, DIG. 76, 97, 98; 423/235, 393

[56] References Cited
UNITED STATES PATENTS

| | | | |
|---|---|---|---|
| 1,464,845 | 8/1923 | Downs et al. ..................... | 23/288 R |
| 2,856,259 | 10/1958 | Bollinger ........................ | 23/288 R X |
| 3,353,799 | 11/1967 | Lions et al. ..................... | 55/233 X |
| 3,475,133 | 10/1969 | Wartenberg ..................... | 23/288 R |
| 3,495,384 | 2/1970 | Alliger .......................... | 55/233 |
| 3,696,589 | 10/1972 | Liebig et al. ..................... | 55/233 |
| 3,706,538 | 12/1972 | Chew ............................ | 23/284 |
| 3,708,958 | 1/1973 | Duty et al. ..................... | 55/233 |
| 3,754,074 | 8/1973 | Grantham ....................... | 423/235 X |
| 3,795,730 | 3/1974 | Kalvinskas ...................... | 55/68 X |

FOREIGN PATENTS OR APPLICATIONS

| | | | |
|---|---|---|---|
| 1,077,186 | 4/1954 | Germany ........................ | 23/288 R |

*Primary Examiner*—Morris O. Wolk
*Assistant Examiner*—Bradley Garris
*Attorney, Agent, or Firm*—Ladas, Parry, Von Gehr, Goldsmith & Deschamps

[57] ABSTRACT

Apparatus in which a gas such as air, containing nitrogen oxides, is mixed with high temperature steam of 130° to 150°C in a reactor vessel to convert the nitrogen oxides to soluble substances and then dissolve said soluble substances in a liquid absorbent such as warm water or a weak alkaline warm aqueous solution, said liquid absorbent being collected thereafter, so that the nitrogen oxides are separately removed from the gas. The apparatus of the invention has an attainable efficiency of separately removing nitrogen oxides exceeding 95 percent, for gas having the nitrogen oxides content of 100 ppm to 10,000 ppm.

3 Claims, 2 Drawing Figures

APPARATUS FOR REMOVING NITROGEN OXIDES FROM A CONTAMINATED GAS CONTAINING THE SAME

This is a division, of application Ser. No. 313,372 filed Dec. 8, 1972, and now abandoned.

The present invention relates to an apparatus for removing nitrogen oxides from a contaminated gas such as air, and more particularly from a gas in which the principal contaminant comprises nitrogen oxides.

It is known that in the acid treatment of metals and in the operation of a fuel combustion furnace such as a boiler, a large quantity of nitrogen oxides, sulfur oxides and the like are produced, and if these oxides are released in the air, problems of air pollution may arise. Especially, nitrogen oxides, one group of detrimental oxides, which include varied compounds of nitrogen (N) and oxygen (O) such as NO, $NO_2$, $N_2O_3$, $N_2O_4$, $N_2O_5$, etc., and their chemical symbols generally are expressed as $N_xO_y$ (x and y are arbitrary integers). Once having been released to be mixed in air, it is then difficult to separately remove such oxides from the mixture. As regards nitrogen monoxide (NO), particularly, there have been no effective processing methods proposed or practiced due to the fact that it does not readily dissolve in water or an alkaline solution.

For example, in the process of chemical treatment of metal containing material employing a solution of nitric acid, a large quantity of nitrogen oxides ($N_xO_y$) is produced through a chemical reaction expressed as follows:

$$[M]_n + HNO_3 \rightarrow M(NO_3)_n + N_xO_y + H_2O$$

(Note: M is metal and n is an integer.) In an effort to remove such nitrogen oxides, there has hitherto been available the simple method of passing the gas mixture through a liquid absorbent comprising water or an alkaline solution such as caustic soda (NaOH) or ammonia ($NH_4OH$). However, this method has proved imperfect in that the attainable efficiency of separately removing nitrogen oxides is rather low and further in that nitrogen monoxide (NO) is left substantially free from being absorbed; also the efficiency of separation according to the method tends to be far lower when the nitrogen oxides content is relatively small.

The present invention provides apparatus for processing gases, and more particularly gases containing a large quantity of nitrogen oxides.

In the first place, the invention provides a gas purifying apparatus which makes it possible to separately remove nitrogen oxides from such gases containing nitrogen oxides, in a highly efficient manner.

In the second place, the invention provides a high efficiency apparatus which makes it possible to convert insoluble nitrogen oxides to soluble substances so as to effect separation of said soluble substances by causing them to be absorbed into a liquid absorbent.

Finally, in the third place, the invention provides an industrial exhaust gas purifying apparatus which makes it possible to separate out, through absorption, all soluble substances such as sulfur oxides as well as nitrogen oxides so that an exhauster in the apparatus delivers only purified gases.

In accordance with the invention there is provided apparatus for removing nitrogen oxides from a contaminated gas containing the same, comprising the combination of the following features:

a. a reactor vessel;
b. an inlet port for supplying the contaminated gas to the reactor vessel;
c. a first reaction chamber in said vessel for receiving said contaminated gas;
d. means for supplying high temperature steam to said first reaction chamber whereby the original nitrogen oxides in said contaminated gas are converted to more soluble forms;
e. a layer of porous catalyst material constituting a heat barrier through which passes the converted gas product from said first reaction chamber, whereby further conversion of said nitrogen oxides to more soluble forms is effected by catalytic action;
f. a second reaction chamber in said vessel for receiving the further converted gas product after passage through said layer of porous catalyst material;
g. means in said second reaction chamber for dispersing therein a liquid absorbent for dissolving the more soluble converted forms of the original nitrogen oxides; and
h. means for removing from the reactor vessel the pumped gas and the liquid absorbent containing the dissolved nitrogen oxides.

In practice, it has been found that with the present apparatus, separation or removal of nitrogen oxides from gas having nitrogen oxides content of 100 ppm to 10,000 ppm is attained with the efficiency of separation exceeding 95 percent, while other soluble substances included in the gases to be processed, such as sulfur oxides, are simultaneously advantageously dissolved in the liquid absorbent. Thus, the volume of gas, such as for example air, being released from the apparatus will turn out clean and pure.

DETAILED DESCRIPTION OF THE INVENTION

Figure 1:
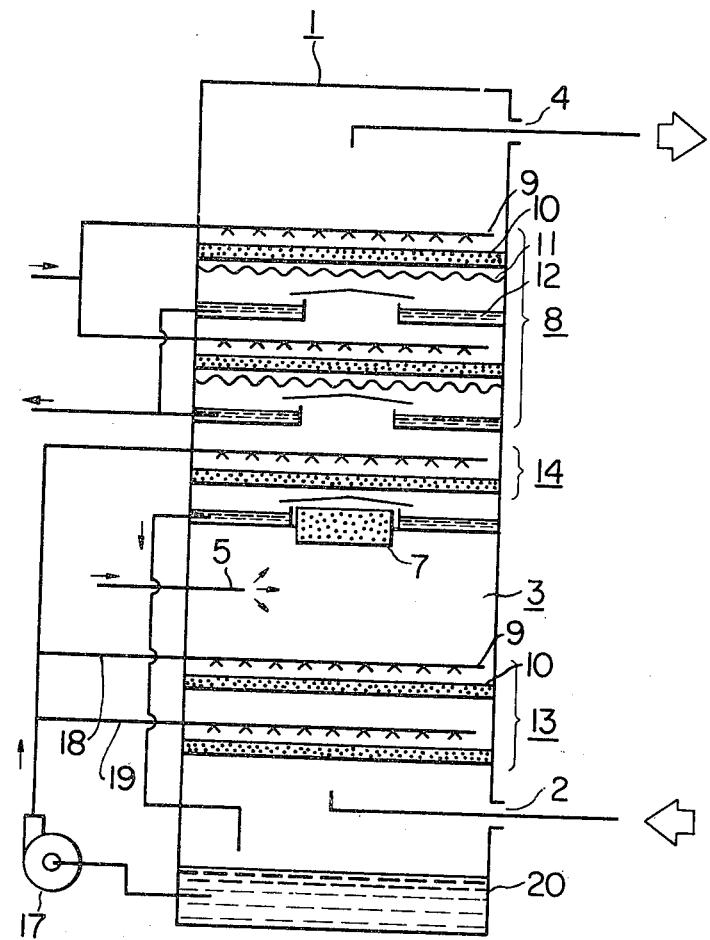
FIG. 1 is a longitudinal sectional view schematically showing one embodiment of the invention.

Referring to FIG. 1, the apparatus comprises a reactor vessel 1 which provides a lower inlet port 2 for supplying nitrogen oxides containing gases that are to be processed (such as air) into said reactor vessel 1. A first reaction chamber 3 is provided for mixing said gases and high temperature steam together, and an outlet port or exhaust port 4 is located adjacent the uppermost portion of the vessel. Into the first reaction chamber 3, opens a nozzle pipe 5 for blowing a spray of high temperature steam, for example approximately 145°C, so that the gases to be processed are mixed with said high temperature steam in this region of the first reaction chamber 3. Within this gas mixture, nitrogen oxides are converted to soluble gases according to the following formulas of chemical reaction.

$$2NO_2 \text{ (or } N_2O_4) + H_2O \rightarrow HNO_3 + HNO_2$$

$$NO + NO_2 + H_2O \rightarrow 2HNO_2$$

$$2NO_2 + \tfrac{1}{2} O_2 + H_2O \rightarrow 2HNO_3$$

In this connection, since a comparatively higher temperature is reached within the first reaction chamber 3 due to the high temperature steam being sprayed, there will occur other reactions in addition to the above described ones between nitrogen oxides and steam, as represented by the formulas given below.

$$2NO + O_2 \rightarrow 2NO_2$$
$$2NO_2 \rightarrow N_2O_4$$

In this manner, these nitrogen oxides are converted to nitric acid gas (HNO$_3$) or nitrous acid gas (HNO$_2$) in accordance with the above described reaction formulas.

Further, this gas mixture again achieves various gas phase reactions of the character described during passing through a layer of porous filler material 7 provided across the ascending path of said gas mixture and in communication with the first reaction chamber 3. This layer of porous filler material 7 is fabricated from a suitable porous member made of sintered glass powders of 100 $\mu$ to 1000 $\mu$ each in size, and this material provides a catalytic action for the above-mentioned gas phase reactions. To enhance the extent of such catalytic action, the layer of porous filler material 7 may include additional components such as activated carbon, activated alumina, or silica gel.

The gases which have gone through the above described processes of reaction are then conducted into the second reaction chamber 8, where soluble substances being carried in the gases are dissolved in a liquid absorbent. The second reaction chamber 8 provides spraying means for dispersing the liquid absorbent, which spraying means comprises a jet pipe 9 having a plurality of small holes, a porous layer 10 and a corrugated plate 11 having a plurality of small holes therein. In this region of the second reaction chamber 8, the nitric acid gas (HNO$_3$) and nitrous acid gas (HNO$_2$) (referred to as a nitric acid gas group hereinafter) which have previously been formed in the first reaction chamber 3 are dissolved into the liquid absorbent. This liquid absorbent may be either water or an alkaline solution, and it continuously flows in circulating manner through and between absorbent sinks 12 and the jet pipe 9 so as to attain sufficiently close contact with the nitric acid gas group in the second reaction chamber 8. The porous layer 10 is fabricated of the same material as the previously described layer of porous filler material 7, and is normally maintained wet with liquid absorbent from the jet pipe 9, that distributes the liquid all over the layer. In this region of the porous layer, 10 there also takes place absorption of the nitric acid gas group. The corrugated plate 11 has a plurality of small holes therethrough located around the bottoms of the wave-like sections, which holes serve to achieve more uniform, extensive contact between the ascending gas flow, still including residues of the nitric acid gas group, and the dripping liquid absorbent.

Further, it will be appreciated that the second reaction chamber 8 may provide a number of such spraying means, each consisting of a jet pipe 9, porous layer 10 and corrugated plate 11 with holes, as in a multiple stage structure, thereby enhancing the efficiency of absorbing the nitric acid gas group. In FIG. 1, the structure is shown as having a two-stage spraying means. In such a multiple stage structure, also, the corrugated plates are preferably arranged rectangularly to one another so that even if the vertical axis of the reactor vessel should adversely incline to some extent, it is possible to reduce the problems of uneven contact between the nitric acid gas group and the liquid absorbent since the falling liquid absorbent is received uniformly by the recesses formed in the plates.

In the apparatus of FIG. 1, there are provided preliminary reaction chambers 13 and 14 located forwardly and preliminary of the first reaction chamber 3, respectively. While the preliminry reaction chamber 13 serves to pre-heat the gases to be processed, the chamber 14 effects thermal isolation between the first and second reaction chambers 3 and 8, thereby attaining further improvement in the efficiency of processing and also the thermal efficiency of the apparatus. Each of said preliminary reaction chambers 13 and 14 may be composed of the same parts as the spraying means employed in the second reaction chamber 8 or one or more combination of jet pipe 9 and porous layer 10. Spraying from each means is attained by the action of a feed pump 17 for circulating the liquid absorbent stored in the source 20 through the conduits 18 and 19. Preferably, this liquid absorbent is in the form of 30° to 60°C water or a weak alkaline aqueous solution.

The above described apparatus of the invention has been designed for its processing capacity under conditions that the rate of the flow of gas (linear speed) within the reactor vessel is 0.2 m to 0.4 m per second, and the rate of gas flow is approx 2 m$^3$ per minute. The result is that for the supply of nitrogen oxides containing air to be processed, the percentage of separated nitrogen oxides reached approximately 95 percent with the use of steam at 130° to 150°C in temperature, 5 to 10 atmospheres, and 5 Kg to 10 Kg flow rate per hour.

Figure 2:
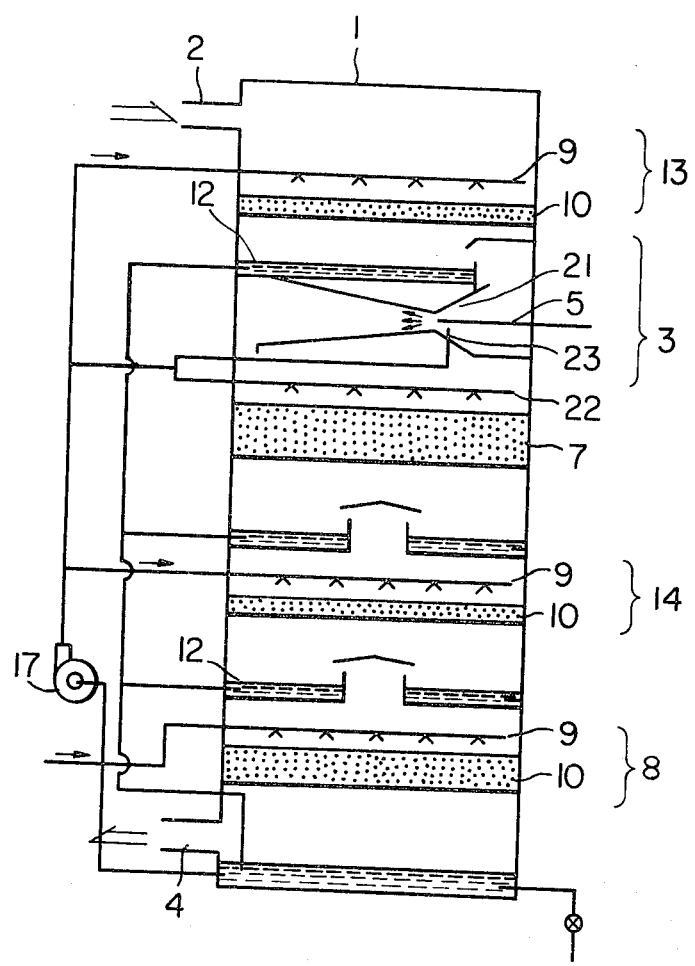
FIG. 2 is a similar view schematically showing another embodiment of the invention.

FIG. 2 shows a modified embodiment of the invention. Here, it is contemplated that gases including nitrogen oxides to be processed are fed into the apparatus through an upper inlet port 2 provided adjacent the uppermost portion of the reactor vessel 1, and they are mixed with high temperature steam within a first reaction chamber 3 so that through a gas phase reaction, the nitrogen oxides are converted to a soluble nitric acid gas group. It is arranged that, soluble substances are dissolved in a liquid absorbent while the remainder of the gas is led to a lower outlet port 4. In the first reaction chamber 3, it is arranged that the gases to be processed are fed to a Venturi portion 21 where a flow of high temperature steam (preferably at 130° to 150°C) at 3 to 5 atmospheric pressure is directed by means of a jet pipe 5, so that the gases and steam are mixed together. This gas mixture is then passed through a layer of porous filler material 7 into a second reaction chamber 8.

The above layer of porous filler material 7 effects a catalytic action for the gas phase reaction of the gas mixture occurring while passing through the layer. This layer of porous filler material 7 is normally kept wet with the liquid absorbent being supplied from a water spraying pipe 22, and in the region of this layer, too, the nitric acid gas group formed through the gas phase reaction is absorbed.

For the purpose of further improving the rate of absorption, an additional absorbent supplying pipe 23 is advantageously provided opening into the negative pressure zone of the Venturi 21 in the main reaction chamber 3, thus providing a supply of fine atomized liquid absorbent through the Venturi 21.

In the apparatus of FIG. 2, are shown preliminary reaction chambers 13 and 14, each comprising sprayer means 9, a porous layer 10 and a liquid absorbent reservoir 12, as provided forwardly and backwardly of the first reaction chamber 3, respectively, and there is also provided a second reaction chamber 8 where the liquid absorbent is collected. In the same manner as the previously described apparatus, the soluble gases are absorbed for removal in the preliminary reaction chambers 13 and 14, however the primary function of these chambers is to provide a heat insulation arrangement.

The second reaction chamber 8 is provided for the purpose of dissolving the soluble gases in the liquid absorbent while effectively collecting the liquid absorbent, and is substantially identical in structure to that described with respect to FIG. 1, excepting that the corrugated plate with a plurality of small holes 11 is omitted in this chamber because of the fact that the gases to be processed are to be passed down from above.

This apparatus of FIG. 2 has been designed for its processing capacity under conditions such that for processing a volume of gas (air) with NO content of 100 to 10,000 ppm, the rate of flow through the system is approx 0,000 m$^3$ per minute. The efficiency of removing NO reached approximately 90%, and more than 98% for NO$_2$ or N$_2$O$_4$. Thus, according to the apparatus, it is possible to separately remove substantially the whole of the nitrogen oxides.

The apparatus of the invention is advantageously used, in chemical plants, metal processing shops, or fuel combustion furnaces such as boilers where gases including a large quantity of nitrogen oxides are produced, to separately remove all the nitrogen oxides from such gases. Also, with the present apparatus, separation of any water-soluble gases such as sulfur oxides are simultaneously achieved due to the fact that high temperature steam is employed in the first reaction chamber while a liquid absorbent comprising warm water or a weak alkaline solution is employed in the second reaction chamber and the preliminary reaction chambers as well. Thus, the apparatus of the invention is useful as an air purifying apparatus.

What is claimed is:

1. In an apparatus for removing nitrogen oxides from a gas contaminated therewith, comprising a reactor vessel; an inlet port for supplying the contaminated gas to said vessel; a first reaction chamber in said vessel for receiving said contaminated gas; means for partially processing said contaminated gas comprising means for supplying high temperature steam to said first reaction chamber to convert at least a portion of the original nitrogen oxides in the contaminated gas to more soluble forms of nitrogen oxide; a second reaction chamber in said vessel for receiving the partially processed contaminated gas containing the converted nitrogen oxides; a gas passage between said first and second reaction chambers; means in said second reaction chamber for dispersing therein a liquid absorbent for absorbing the soluble nitrogen oxides; means for removing the resulting purified, relatively uncontaminated gas; and means for removing the liquid absorbent containing the absorbed nitrogen oxides: the improvement comprising a heat barrier located in the gas passage between said first and second reaction chambers, said heat barrier comprising a layer of porous catalyst extending across substantially the entire cross sectional area of said passage which catalyst enhances the conversion of said nitrogen oxides to more soluble forms, a first preliminary reaction chamber in said vessel having means for preheating the contaminated gas before it enters said first reaction chamber, a second preliminary reaction chamber in said vessel located between said layer of porous catalyst and said second reaction chamber for providing additional thermal isolation between the first and second reaction chambers, and said second reaction chamber being provided with a corrugated plate located beneath the liquid absorbent dispersing means, said plate having a plurality of small holes in the troughs of the corrugations through which the liquid absorbent drips to obtain more uniform contact between the ascending gas containing the converted nitrogen oxides and the liquid absorbent.

2. In an apparatus for removing nitrogen oxides from a gas contaminated therewith, comprising a reactor vessel; an inlet port for supplying the contaminated gas to said vessel; a first reaction chamber in said vessel for receiving said contaminated gas; means for partially processing said contaminated gas comprising means for supplying high temperature steam to said first reaction chamber to convert at least a portion of the original nitrogen oxides in the contaminated gas to more soluble forms of nitrogen oxide; a second reaction chamber in said vessel for receiving the partially processed contaminated gas containing the converted nitrogen oxides; a gas passage between said first and second reaction chambers; means in said second reaction chamber for dispersing therein a liquid absorbent for absorbing the soluble nitrogen oxides; means for removing the resulting purified, relatively uncontaminated gas; and means for removing the liquid absorbent containing the absorbed nitrogen oxides: the improvement comprising a heat barrier located in the gas passage between said first and second reaction chambers, said heat barrier comprising a layer of porous catalyst extending across substantially the entire cross sectional area of said passage which catalyst enhances the conversion of said nitrogen oxides to more soluble forms, a first preliminary reaction chamber in said vessel having means for preheating the contaminated gas before it enters said first reaction chamber, a second preliminary reaction chamber in said vessel located between said layer of porous catalyst and said second reaction chamber for providing additional thermal isolation between the first and second reation chambers, said second reaction chamber being provided with a corrugated plate located beneath the liquid absorbent dispersing means, said plate having a plurality of small holes in the troughs of the corrugations through which the liquid absorbent drips to obtain more uniform contact between the ascending gas containing the converted nitrogen oxides and the liquid absorbent, and said first reaction chamber being provided with a venturi inlet through which the contaminated gas is fed, said high temperature steam supplying means comprising a pipe located in said venturi inlet.

3. In an apparatus for removing nitrogen oxides from a gas contaminated therewith, comprising a reactor vessel; an inlet port for supplying the contaminated gas to said vessel; a first reaction chamber in said vessel for receiving said contaminated gas; means for partially processing said contaminated gas comprising means for supplying high temperature steam to said first reaction chamber to convert at least a portion of the original nitrogen oxides in the contaminated gas to more soluble forms of nitrogen oxide; a second reaction chamber in said vessel for receiving the partially processed contaminated gas containing the converted nitrogen oxides; a gas passage between said first and second reaction chambers; means in said second reaction chamber for dispersing therein a liquid absorbent for absorbing the soluble nitrogen oxides; means for removing the resulting purified, relatively uncontaminated gas; and means for removing the liquid absorbent containing the absorbed nitrogen oxides: the improvement comprising a heat barrier located in the gas passage between said first and second reaction chambers, said heat barrier comprising a layer of porous catalyst extending across substantially the entire cross sectional area of said passage which catalyst enhances the conversion of said nitrogen oxides to more soluble forms, a first preliminary reaction chamber in said vessel having means for preheating the contaminated gas before it enters said first reaction chamber, a second preliminary reaction chamber in said vessel located between said layer of porous catalyst and said second reaction chamber for providing additional thermal isolation between the first and second reaction chambers, said first reaction chamber being provided with a venturi inlet through which the contaminated gas is fed, said high temperature steam supplying means comprising a first pipe located in the venturi inlet, and wherein a second pipe is provided in the venturi inlet for supplying liquid absorbent which passes through the venturi inlet in atomized condition to absorb the soluble nitrogen oxides.

* * * * *